April 4, 1950

F. A. G. PIRWITZ 2,502,668

CAMERA SHUTTER HAVING BUILT-IN
FLASH SYNCHRONIZING MEANS

Filed Aug. 8, 1947

INVENTOR.
Friedrich A. Gustav Pirwitz
BY Harold E. Stonebraker
his Attorney April 4, 1950 F. A. G. PIRWITZ 2,502,668
CAMERA SHUTTER HAVING BUILT-IN
FLASH SYNCHRONIZING MEANS
Filed Aug. 8, 1947 5 Sheets-Sheet 5

INVENTOR.
Friedrich A. Gustav Pirwitz
BY
Harold E. Stonebraker
his Attorney

Patented Apr. 4, 1950

2,502,668

UNITED STATES PATENT OFFICE 2,502,668

CAMERA SHUTTER HAVING BUILT-IN FLASH SYNCHRONIZING MEANS

Friedrich A. Gustav Pirwitz, Rochester, N. Y., assignor to Wollensak Optical Company, Rochester, N. Y., a corporation of New York Application August 8, 1947, Serial No. 767,618

15 Claims. (Cl. 95—11.5)

This invention relates to a flashlight synchronizing mechanism for photographic shutters, with more particular reference to the settable type shutter in which a spring-operated master lever is cocked by a manual operation and held by a trigger which when operated releases the master lever, permitting the latter to operate the shutter at a pre-selected speed, and it has for its object to provide a flashlight synchronizing mechanism adjustable for lamps having different lag characteristics so as to close a flashlight circuit at a predetermined point with reference to operation of the shutter and to insure maximum light intensity when the shutter is fully opened, by means of a switch mechanism that effectually prevents closing the flashlight circuit during setting of the master lever and eliminates uneven movement or chatter of the movable switch contact members or arcing between the contact members as they separate.

More particularly, the invention is intended to provide a spring-operated synchronizing member with a pair of electrically connected contact fingers that close the flashlight circuit by a positive wiping action over a pair of contact plates, the spring fingers being maintained in engagement with the contact plates during firing of the flashlight and maintained in engagement therewith a sufficient length of time thereafter to insure against separating the contacts until after the electric circuit is broken at the lamp.

Still another purpose of the invention is to afford a structure in which a spring-operated synchronizing member carries a pair of circuit-closing contact fingers engageable with a pair of stationary contact plates, one of which is mounted on an adjustable support that is positionable to vary the point at which its contact finger engages the adjustable contact plate to close the flashlight circuit, depending on the lag of the particular lamp in use as for instance either a five millisecond or a twenty millesecond lamp.

A further object of the invention is to afford a structure in which the stationary and adjustable contact plates are disconnected from each other electrically and the circuit closed through the contact fingers on the spring synchronizing member for a five or twenty millisecond lamp, while for a zero lag or maximum speed lamp the adjustable contact plate is moved into engagement with the stationary contact plate, the spring synchronizing member being then rendered inoperative, at which time the circuit is closed by a conducting switch arm that is spaced from the adjustable contact plate and moved into engagement therewith by the shutter master lever, to effect closing of the flashlight circuit at a later point in the shutter opening movement than is possible with the spring synchronizing member, and to effect this by a positive switch operation that eliminates likelihood of arcing and obviates possible jamming of the mechanism in the event that the adjustable contact plate is moved from the maximum speed position to for instance the five millisecond or twenty millisecond position after setting of the master lever and before operating the shutter.

Another purpose of the invention is to afford a practical, simple, economical and efficient structure that is applicable between the inner and outer walls of a shutter housing and is so designed as to prevent arcing or unnecessary wear between the switch contacts and to insure a uniform positive wiping action between them and consequent durability and dependability, as well as a structure that is extremely easy to adjust and operate under all conditions for lamps of variable speeds from a lag of twenty milliseconds or more to a lamp of zero lag or maximum speed and to insure accurate closing of the flashlight circuit at the proper instant in relation to the shutter opening operation.

To these and other ends, the invention consists in the construction and arrangement of parts that will appear clearly from the following description when read in conjunction with the accompanying drawings, the novel features being pointed out in the claims following the specification.

The present invention is in the nature of an improvement of the structure shown in Patent No. 2,404,526, dated July 23, 1946, in which the flashlight circuit was closed by two relatively movable spring contacts, one of which was moved toward and into engagement with the other by a spring-operated synchronizing member during movement of the latter, while in the present structure, the circuit is closed by a pair of electrically connected spring contact fingers mounted upon and movable with the spring-operated synchronizing member, the fingers during their travel engaging a pair of stationary contact plates to close the flashlight circuit, and the present invention has to do with the structure of the spring contact fingers on the synchronizing member and the stationary contact plates, one of which is adjustable to permit the circuit-closing operation at a selected predetermined point by a positive and uniform wiping acton of two contact fingers that engage the respective contact plates and remain in engagement therewith until after the circuit is broken by firing of the lamp, the fingers being disengaged from the contact plates in unset position and one of the fingers being held out of engagement with its contact plate during the setting movement.

Figure 1:
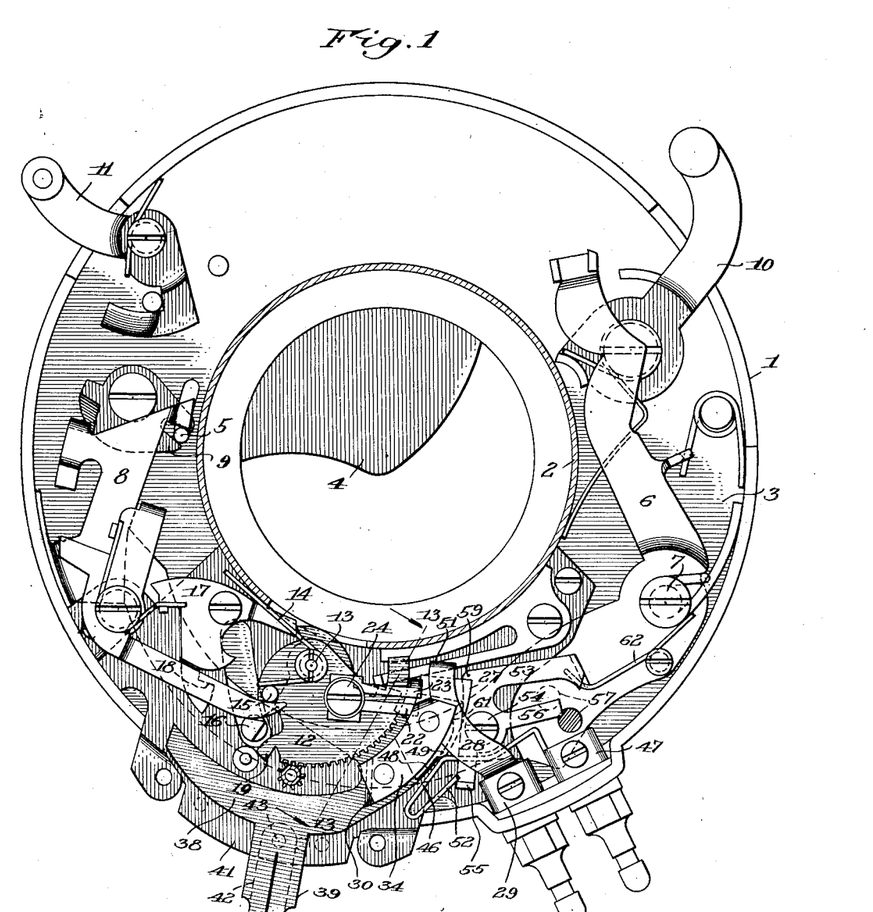
Fig. 1 is a plan view of a shutter of the settable type, illustrating the adjustable contact plate in position for firing a five millisecond lamp, and with the shutter master lever and spring-operated synchronizing member in normal or unset position.
Figure 2:
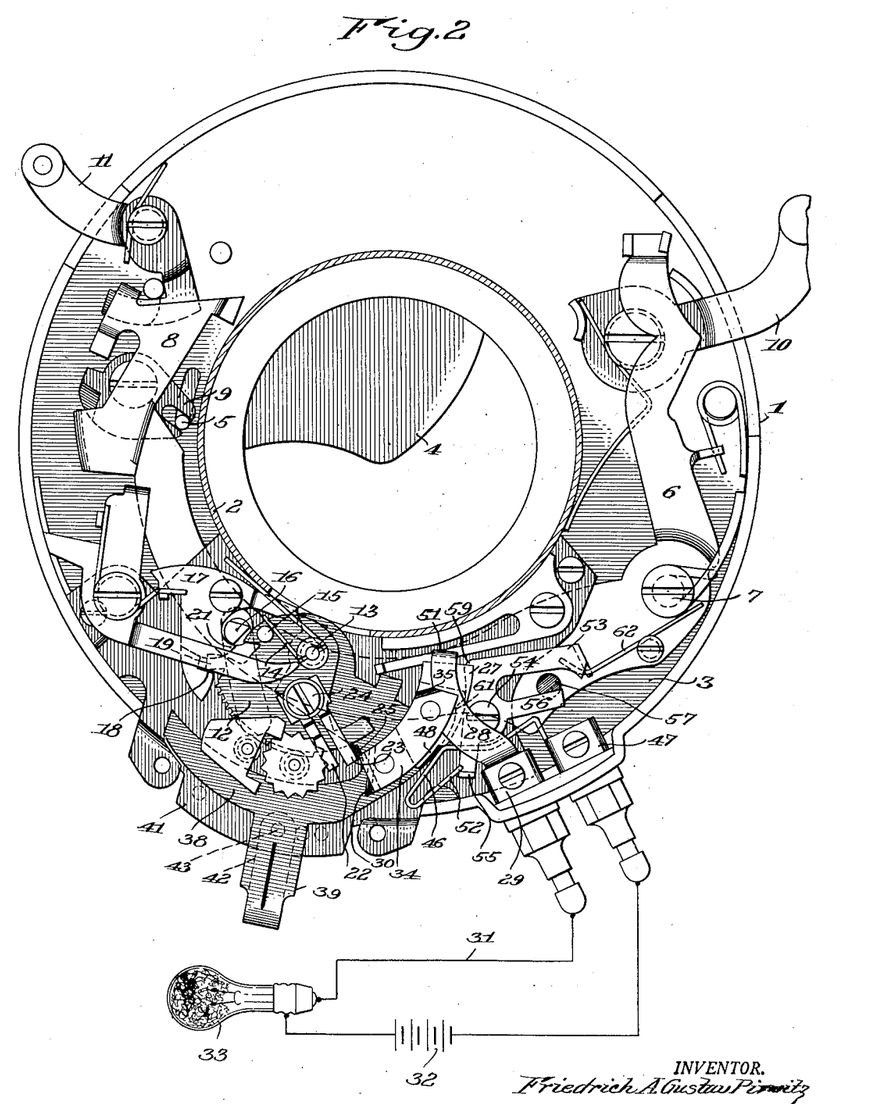
Fig. 2 is a similar view with the flashlight circuit indicated diagrammatically, and showing the shutter master lever and spring synchronizing member moved into set position ready for operation upon manipulating the trigger.

Referring more particularly to the drawings and to Figs. 1 and 2, 1 and 2 designate the outer and inner walls of the shutter housing while 3 is the bottom wall, and 4 are the shutter leaves connected to and operated by a shutter ring, not shown, as usual in this type of construction. The shutter ring carries a pin 5 that is alternately moved in opposite directions to open and close the shutter during the return movement of a shutter master lever 6 that is pivoted on the post 7 and has an operating portion 8 which during the return movement of the master lever operates a shutter actuating lever 9 to open the shutter, and then engages the pin 5 to close the shutter.

10 designates the setting lever that is manually operated to move the shutter master lever 6 to set position, and 11 designates the trigger that is manually operated to release the shutter master lever 6 and permit return movement of the latter under the impulse of its operating spring to open and close the shutter when an exposure is to be made.

12 designates a spring-operated synchronizing member pivotally mounted for swinging movement on a post 13 and actuated when released by the spring 14 surrounding the post 13 and having one end abutting the inner wall of the housing while the other end engages a pin 15 carried by the synchronizing member. The synchronizing member is set by the setting movement of the shutter master lever which carries a pin 16 that moves upwardly upon movement of the master lever to set position and engages a recess in the synchronizing member, causing the latter to travel in a clockwise direction from the position shown in Fig. 1 to the position shown in Fig. 2, where the synchronizing member is held in set position by a pivoted locking device 17 having a latch 18 that engages a projection 19 on the synchronizing member. When the master lever is released, the pin 16 during its downward travel engages the nose 21 of locking device 17, tilting the latter and moving the latch 18 away from under the projection 19, thus releasing the synchronizing member for its operating movement under the impulse of its spring. The mechanism and operation thus far described are substantially in accordance with Patent No. 2,404,526, and the present invention has to do particularly with the structure of the flashlight circuit-closing switch that is controlled by the spring-operated synchronizing member and the details of this switch mechanism will now be described.

Figure 6:
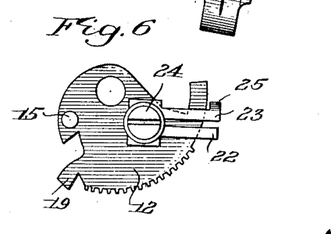
Fig 6 is a detail view in elevation of the spring-operated synchronizing member with the circuit-closing spring contact fingers fixedly mounted thereon.

Referring to Figs. 1, 2 and 6, the synchronizing member 12 has fixed thereto a pair of electrically connected spring contact fingers 22 and 23 respectively, preferably spaced from each other in perpendicular planes and in the form of a bifurcated conducting plate that is insulated from the synchronizing member 12, and secured thereto by the screw 24. The spring contact finger 23 has a lateral downwardly inclined terminal portion 25 at its outer end for a purpose that will appear presently, and the fingers 22 and 23 are yieldable in a vertical plane to engage under slight pressure and frictionally with a wiping action the stationary contact plates during the operating travel of the synchronizing member and thus to close the flashlight circuit at a pre-selected point, as will now be described.

Figure 11:
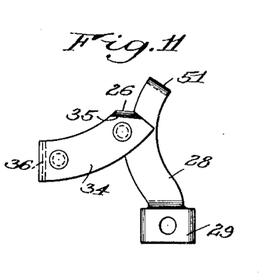
Fig. 11 is a detail plan view of the stationary contact plate.
Figure 12:
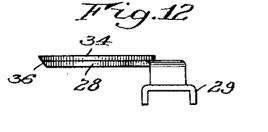
Fig. 12 is a view in edge elevation of the same.
Figure 16:
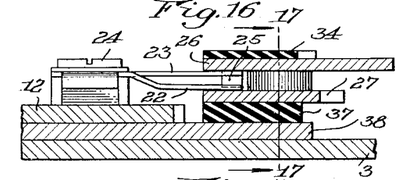
Fig. 16 is a similar view showing the spring contact fingers in operative position when moving to close the flashlight circuit.

Referring to Fig. 16, during the operating movement of the spring synchronizer, spring contact finger 23 engages by upward pressure a stationary contact plate 26, while spring contact finger 22 engages by downward pressure the adjustable contact plate 27. The position to which the contact plate 27 is adjusted determines the point at which it is engaged by the spring contact finger 22 and consequently the point at which the flashlight circuit is closed. The fixed contact plate 26, see Figs. 11 and 16, is part of an arm 28 that includes a terminal portion 29 by which it is fastened to a block forming part of one of the jacks that are connected to the flashlight circuit 31, see Fig. 2, that includes battery 32 and flash bulb 33. Secured to the upper side of contact plate 26 is a plate 34 of insulating material over which the spring contact finger 23 rides and with which it engages during the setting movement of the spring synchronizing member to prevent closing the flashlight circuit during the setting operation or prior to the shutter opening operation. To facilitate this action, the contact plate 26 and insulating plate 34 are bevelled at their ends as indicated at 35 and 36 for cooperation with the inclined terminal portion 25 on the spring finger 23.

Figure 13:
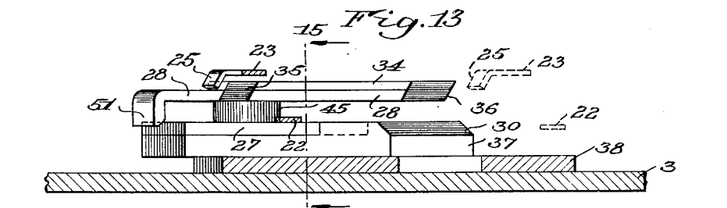
Fig. 13 is a sectional view taken on line 13—13 of Fig. 1 and showing the relative position of the spring contact fingers and stationary contact plates when in unset position and with the adjustable contact plate positioned for a five millisecond lamp.

In the initial unset position of the spring synchronizing member, the inclined terminal portion 25 is positioned adjacent to the bevelled surface 35, as shown in Fig. 13, and the setting movement of the synchronizing member causes the inclined portion 25 to engage and ride upwardly along the bevelled surface 35 of the insulating plate 34 and over the top surface of said insulating plate during the setting movement. In the set position of the synchronizing member, the inclined terminal portion 25 drops below the upper surface of the insulating plate 34, as shown in dotted lines in Fig. 13, and when the synchronizing member is released for operating movement, the bevelled surface 36 forces the inclined terminal portion 25 and with it the spring contact finger 23 down under the contact plate 26, so that during the return or operating movement of the synchronizing member, the spring finger 23 engages the contact plate 26 to close the circuit, which at the same time is closed by spring contact finger 22 wiping over and in engagement with the contact plate 27. The latter is bevelled as at 30 to guide the finger 22 upwardly thereon during the return movement of the synchronizing member, at a point depending on the position of adjustment of the plate 27.

To adjust the contact plate 27, it is mounted on a block of insulation 37 which in turn is fixedly attached to the adjustable support or plate 38, the latter being mounted for swinging movement about the aforementioned post 13 on which the spring synchronizing member is movable. The support 38 carries an extension 39 that projects outwardly over an index plate 41 and is provided with an underlying spring arm 42 with an upset projection 43 that engages suitable recesses in the underside of the index plate, so as to retain the adjustable support 38 and with it the adjustable contact plate 27 frictionally and releasably in any position to which it is manually adjusted as for instance to accommodate a twenty millisecond lamp, a five millisecond lamp, a zero lag or maximum speed lamp, or in the "off" position where the flashlight circuit is disconnected and the shutter can be operated without functioning of the flashlight mechanism.

Figure 17:
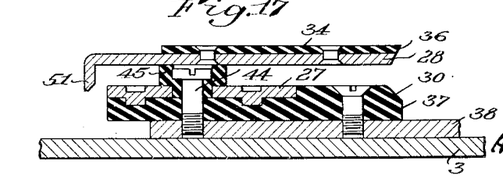
Fig. 17 is a sectional view on line 17—17 of Fig. 16.

The adjustable contact plate 27 is secured in place on its support 38 by means of a screw 44, see Fig. 17, which also holds in place an insulating spacing block 45 that separates the upper contact plate 26 from the lower adjustable contact plate 27, and holds the upper contact plate properly spaced therefrom. During the operation of the spring synchronizing member for either a twenty millisecond or five millisecond lamp, the circuit is closed for either position of the adjustable contact plate 27 through a spring-yieldable conducting switch arm 46, see Figs. 1 and 2, that has one end provided with a terminal portion 47 that is fixed to a block forming part of the second jack from which connection is made to the flashlight circuit 31, the spring conducting switch arm 46 being in engagement with the outermost edge of the adjustable contact plate 27 when the latter is positioned for a five millisecond lamp as in Figs. 1 and 2, or for a twenty millisecond lamp, and when the adjustable contact plate is moved into position for a zero lag or maximum speed lamp, as in Figs. 4 and 5, the structure provides for separating the conducting switch arm 46 from engagement with the adjustable contact plate and closing the circuit at the instant when the shutter is fully open by the direct operation of the shutter master lever which effects movement of the conducting switch arm 46 toward the adjustable contact plate and into engagement therewith.

Figure 14:
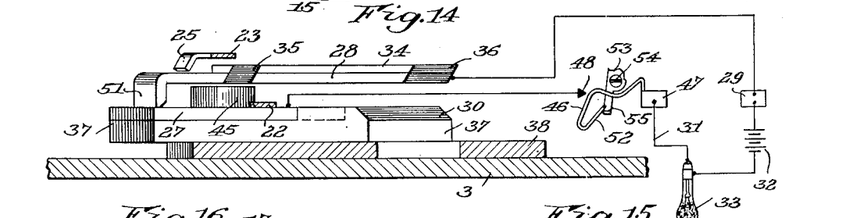
Fig. 14 is a view similar to Fig. 13, with the flashlight circuit indicated diagrammatically, and showing the position of the contact plates in engaging relation when the adustable contact plate is positioned for a zero lag or maximum speed lamp and the spring synchronizing member is inoperative.
Figure 15:
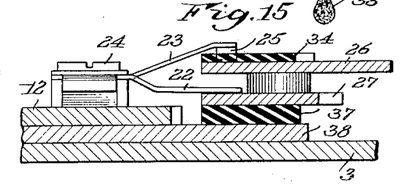
Fig. 15 is a vertical sectional view on line 15—15 of Fig. 13, showing the spring contact fingers in normal or unset position.

To accomplish this, the adjustable contact plate 27 has its edge that engages the conducting switch arm 46 cut away or recessed as indicated at 48, see Fig. 2. Thus when the adjustable contact plate is positioned for a five millisecond or a twenty millisecond lamp, the conducting switch arm 46 is in engagement with the outermost edge 49 of the conducting plate 27, and when the latter is adjusted for a zero lag lamp, the recessed portion 48 is opposite the conducting switch arm and out of engagement therewith until the latter is actuated by the master lever in a manner that will presently be described. Thus when the adjustable contact plate is positioned for either a five millisecond or twenty millisecond lamp, the flashlight circuit is closed to fire the lamp at the instant when the lower spring contact finger 22 during its travel engages its contact plate 27, the circuit being closed at this time by the engagement between the outermost edge of the adjustable contact plate and the conducting switch arm 46. When the adjustable contact plate is positioned for a zero lag or maximum speed lamp, the spring-operated synchronizing member and the spring contact fingers do not function, and closing of the flashlight circuit is effected by the movement of the conducting switch arm 46 from the position shown in Fig. 3 to the position shown in Fig. 4. When the adjustable contact plate is in this position, it is necessary to establish electrical connection between the upper and lower contact plates since the spring contact fingers are not functioning at this time. To accomplish this, the upper contact plate 26 is provided with a downwardly projecting extension 51 at its inner end, as shown in Fig. 13. This depending extension 51 lies beyond and out of engagement with the adjustable contact plate when the latter is positioned for either five millisecond or twenty millisecond lamps, but when the adjustable contact plate is moved for cooperation with a zero lag or maximum speed lamp, the lower contact plate 27 is moved inwardly of the shutter housing to the position shown in Fig. 14 where it is engaged with the downwardly depending extension of the upper contact plate 26 and thus the circuit is completed at this point and ready for the circuit closing operation when the master lever reaches the point in its travel where the shutter is fully open and operates the conducting switch arm 46 to close the circuit and fire the lamp. The particular mechanism by which the conducting switch arm 46 is moved into circuit-closing relation with the adjustable contact plate by means of the master lever will now be described.

The conducting arm 46 has a terminal portion 52, see Fig. 1, bent upon the body portion and spaced therefrom affording a yieldable extremity that is engaged to move the conducting switch arm against the contact plate, and such movement of the switch arm is effected by a device in the form of a plate 53 pivoted on the post 54 and having an upstanding arm 55 that engages the yieldable terminal portion 52 when actuated by the master lever. To effect such movement of the actuating device or plate 53, it is provided with a tongue 56 that lies in the path of a pin 57 carried by the master lever 6 when the latter is in set position and the adjustable contact plate is positioned for a zero lag or maximum speed lamp.

Figure 3:
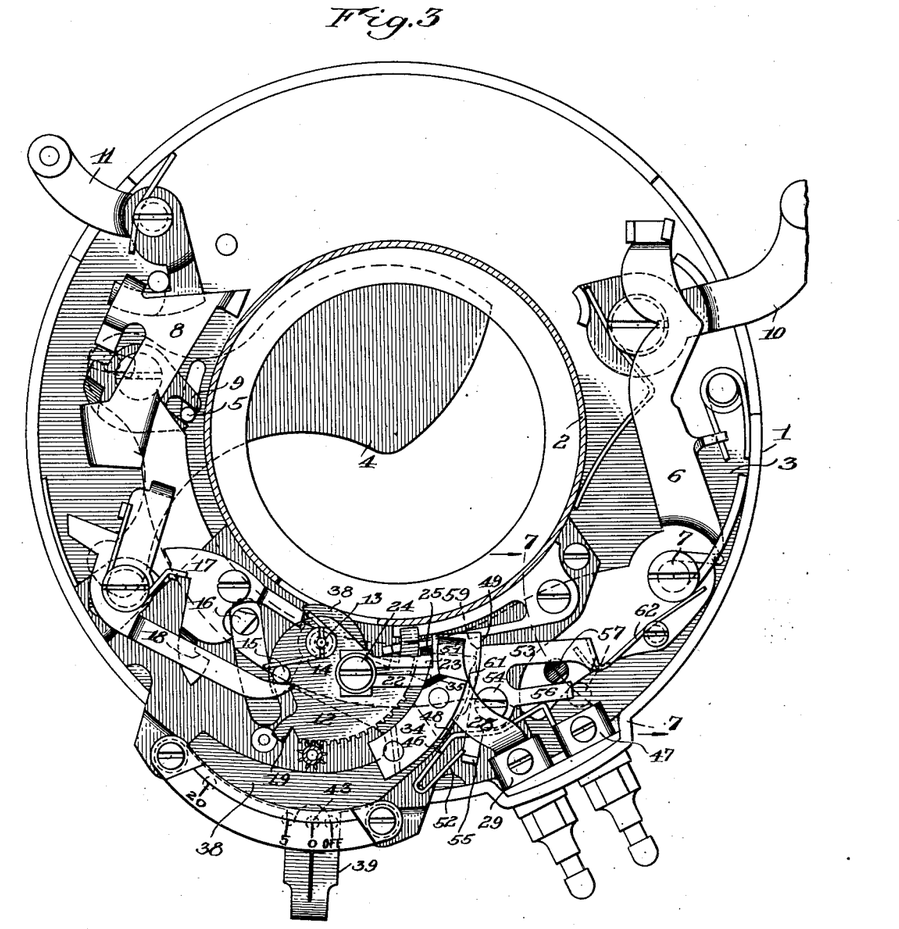
Fig. 3 is a similar view showing the adjustable contact plate positioned for a zero lag or maximum speed lamp and with the shutter master lever in set position, the spring synchronizing member appearing in normal or unset position.
Figure 7:
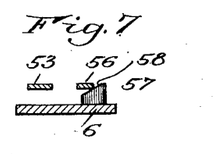
Fig. 7 is a detail sectional view on line 7—7 of Fig. 3 illustrating the position of the shutter master lever and switch actuating device for a maximum speed lamp with the parts in normal or unset position.
Figure 8:
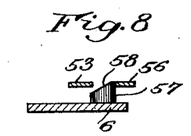
Fig. 8 is a similar view illustrating the position of said parts when the master lever has moved to set position, in readiness to move the actuating device when released.

Referring to Figs. 7 and 8, the pin 57 on the master lever is bevelled on one side at 58 so that when the master lever moves from its initial position to set position, as shown in Fig. 3, the bevelled surface 58 of the pin 57 initially engages the tongue 56 which flexes upwardly and permits the pin 57 to ride thereunder from the position shown in Fig. 7 to the position shown in Fig. 8, and in the latter position, the operating device or plate 53 is retained by the pin 57. When the master lever is released and moves through its shutter-operating cycle, the pin 57 engaging the tongue 56 moves the actuating plate 53 on its pivot and thus operates the conducting switch arm 46 from the position shown in Fig. 3 to the position shown in Fig. 4 where it engages the edge of the contact plate 27 and closes the flashlight circuit.

Figures 4, 5:
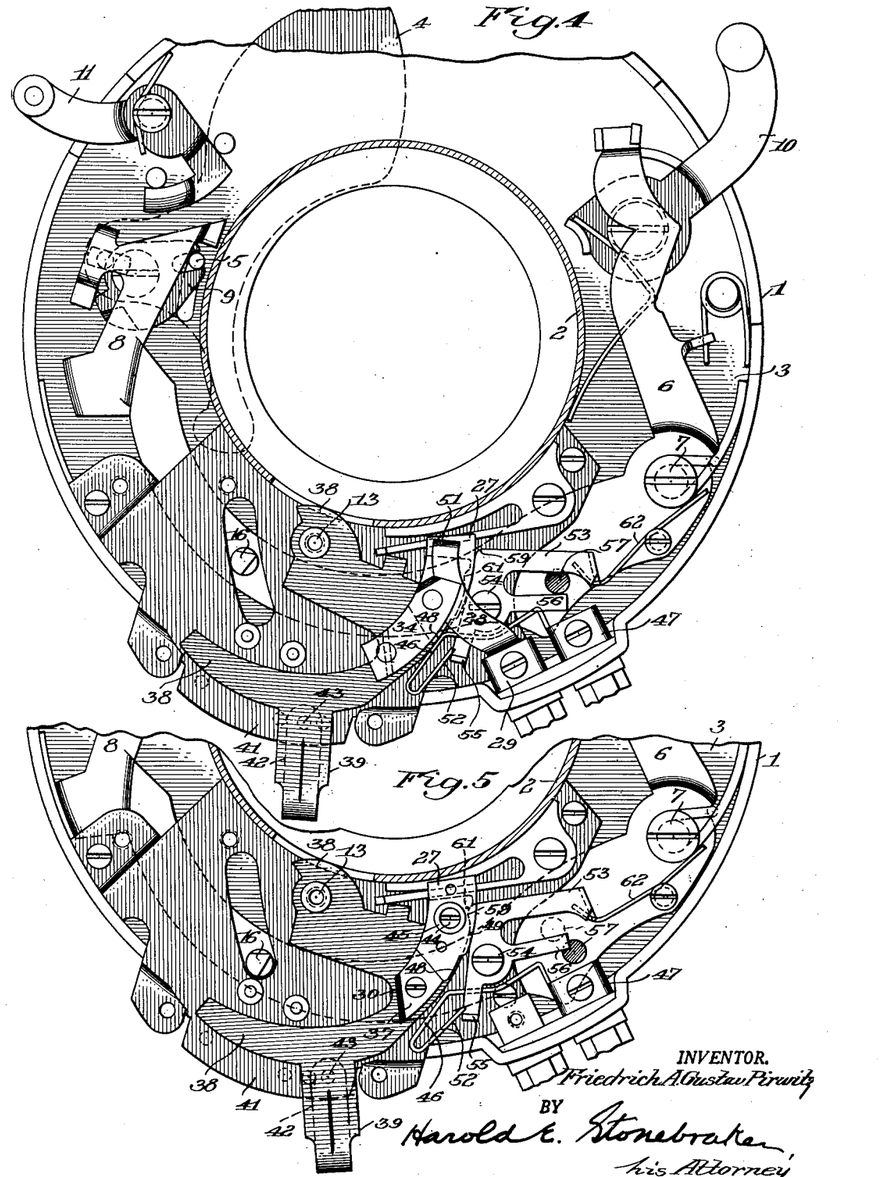
Fig. 4 is a similar view showing the position of the parts when the shutter master lever has been released and moved sufficiently to close the flashlight circuit.
Fig. 5 is a similar view, partially broken away, showing the position of the parts when the adjustable contact plate is positioned to disconnect the flashlight circuit and permit operation of the shutter without affecting the flashlight circuit.
Figures 9, 10:
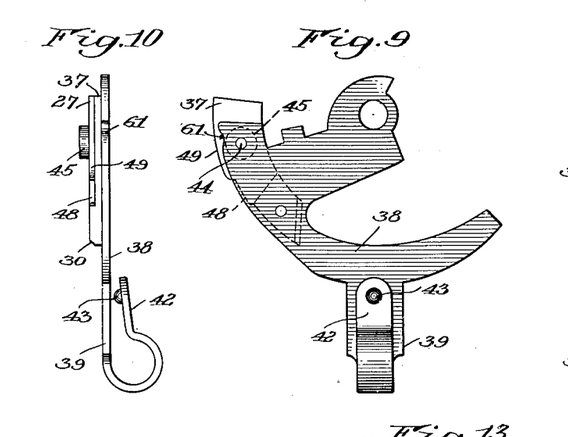
Fig. 9 is a detail view in elevation of the adjustable contact plate and the adjustable support on which it is mounted.
Fig. 10 is a view in edge elevation of the same.

It is necessary that the actuating plate 53 be positioned to operate the conducting switch arm 46 only when the adjustable contact plate is positioned for a zero lag lamp and to move the actuating plate 53 out of operative position when the adjustable contact plate is positioned for a five millisecond or twenty millisecond lamp, and this is accomplished by providing the actuating plate 53 with a nose 59, see Figs. 3 and 5, which cooperates with a recess 61 in a cam surface formed on the edge of the adjustable support 38 on which the adjustable contact plate is mounted, see Fig. 9. The actuating plate 53 is moved in an anti-clockwise direction and retained in the position shown in Fig. 2 by a spring 62, and in this position, the tongue 56 is arranged so that the pin 57 of the master lever does not move beyond the tongue and therefore does not operate the actuating plate 53 when the master lever is released. When the adjustable contact plate is positioned for a zero lag or maximum speed lamp, the inner tip of the cam surface on plate 38 engages the nose 59 of the actuating plate 53, see Fig. 3, moving the latter to the position there shown so that upon the operation and release of the master lever, the actuating plate 53 is engaged and operated by the pin 57 to close the flashlight circuit through the conducting switch arm 46 and contact 27 at the instant in the path of travel of the master lever when the shutter is fully open.

When the adjustable contact plate is moved to the "off" position shown in Fig. 5, the nose 59 of the actuating plate 53 moves into the recess 61 of the cam plate 38, permitting the spring 62 to actuate the plate 53 anti-clockwise to a position where the tongue 56 is not engaged by the pin 57, and in this position of the parts, the shutter can be operated without affecting the flashlight circuit. When the adjustable contact plate is in the five or twenty millisecond position, the actuating plate 53 is released by cam plate 38 and moves anti-clockwise to the same position as that just described.

The operation of the mechanism briefly is as follows: The adjustable arcuate contact plate 27 which is mounted on the adjustable arcuate support 38 is positionable for either a twenty millisecond lamp, a five millisecond lamp, a zero lag or maximum speed lamp, or in an "off" position where the flashlight circuit is inoperative. When adjusted to a twenty millisecond lamp or a five millisecond lamp position, the spring-operated synchronizing member 12 is set by the operation of setting the master lever as in Patent No. 2,404,526, and when the master lever is released by the trigger 11, the synchronizing member 12 is released and the flashlight circuit is completed as soon as the spring contact finger 22 reaches and engages the adjustable arcuate contact plate 27 at which time the spring contact finger 23 will already have engaged the arcuate fixed contact plate 26 as in Fig. 16. The contact fingers 22 and 23 are actuated by their spring tension downwardly and upwardly respectively so as to be held yieldably against their contact plates and to move thereacross with a positive wiping action during the travel of the synchronizing member, and the length of the contact plates and time of engagement of the contact fingers therewith is such as to insure their continued engagement until such time as the lamp has been fired and the circuit broken at the lamp. Thus by the time the spring synchronizing member reaches the end of its travel and the spring finger 23 is disengaged from its contact plate 26, as in Fig. 13, the circuit will already have been interrupted and there is no chance of arcing because there is no current then passing between the contacts. During the operation for either a twenty millisecond or a five millisecond lamp, the circuit is completed through the spring contact fingers 22 and 23 mounted on the spring-operated synchronizing member and the circuit is maintained closed between the adjustable contact plate 27 and the conducting switch arm 46 because the contact plate is in such position that its outermost edge engages the conducting switch arm 46 as in Figs. 1 and 2, and the same condition would apply for a twenty millisecond lamp adjustment since the adjustable contact plate would be moved clockwise from the position of Fig. 1 and its outermost edge would remain engaged with the conducting switch arm 46. During such operations, the actuating plate 53 is in its inoperative position, as illustrated in Figs. 1 and 2.

When the adjustable contact plate is moved to position for a zero lag or maximum speed lamp, as in Figs. 3 and 4, the spring-operated synchronizing member is rendered inoperative, the same as in Patent No. 2,404,526, so that the spring contact fingers do not function, and in this position the conducting switch arm 46 is out of engagement with the contact plate 27 and the actuating plate 53 is moved under the impulse of its spring 62 to operating position, such that the pin 57 on the master lever will engage the tongue 56 and move the actuating plate upon the return movement of the master lever. At that time, the arm 55 on the actuating plate 53 engages the yieldable terminal portion 52 on the conducting switch arm 46 and moves the latter into engagement with the contact plate 27 as in Fig. 4, completing the flashlight circuit at the instant in the travel of the master lever when the shutter is fully open. During such operation, the contact plate will have been adjusted far enough to bring it into engagement with the depending extension 51 on the stationary contact plate 26, as in Fig. 14, thus establishing electrical connection between the contact plates 26 and 27 at this time when the spring contact fingers 22 and 23 are not functioning and when the parts are adjusted for a zero lag lamp operation.

The yieldable terminal portion 52 is provided on the conducting switch arm 46 in order to permit relative movement between the terminal portion 52 and the body of the switch arm and to prevent jamming and consequent damage to the mechanism in case the adjustable contact plate is positioned for a zero lag lamp with the actuating plate 53 in the position shown in Figs. 3 and 4 and thereafter the operator should change the adjustment to a five millisecond lamp or twenty millisecond lamp position, after the master lever is moved to set position and before operating the shutter. In such case, the mechanism would move through a cycle upon release of the trigger, the master lever would operate the actuating plate 53, and the arm 55 would engage and move the yieldable terminal portion 52 toward the body of the conducting arm 46 which would already be in engagement with the edge of the contact plate 27, but owing to the yieldability of the terminal portion 52, the parts would not jam and no harm would result to the mechanism in the event of such an abnormal operation. When the adjustable contact plate is moved to the "off" position illustrated in Fig. 5, the spring synchronizing member and the actuating plate 53 are both in their inoperative positions and the flashlight circuit remains open without being affected by the shutter operation.

While the invention has been described with reference to the particular details herein shown, it is not confined to the exact embodiment disclosed, and this application is intended to cover such modifications or departures as may come within the purposes of the improvements or the scope of the following claims.

I claim:

1. In a photographic shutter of the settable type including a pivotally mounted spring-operated flashlight synchronizing member a flashlight circuit including a pair of spaced stationary contact plates in different planes insulated from each other, a pair of spaced electrically connected spring contact fingers insulated from and mounted on said pivoted synchronizing member for movement therewith and having wiping engagement over said stationary contact plates in different planes, one of said contact plates having an insulating plate on one side and the corresponding contact finger wiping over said insulating plate out of engagement with the contact plate during setting movement of the synchronizing member, and cooperating means on the insulating plate and contact finger acting to guide the contact finger on to the insulating plate at the beginning of said setting movement.

2. In a photographic shutter of the settable type including a pivotally mounted spring-operated flashlight synchronizing member a flashlight circuit including a pair of spaced stationary contact plates in different planes insulated from each other, a pair of spaced electrically connected spring contact fingers insulated from and mounted on said pivoted synchronizing member for movement therewith and having wiping engagement over said stationary contact plates in different planes, one of said contact plates being adjustable in relation to the other contact plate to vary the time of closing the flashlight circuit in relation to the time of shutter opening and the other of said contact plates having an insulating plate on one side and the corresponding contact finger wiping over said insulating plate out of engagement with the contact plate during setting movement of the synchronizing member, and cooperating means on the insulating plate and contact finger acting to guide the contact finger on to the insulating plate at the beginning of said setting movement.

3. In a photographic shutter of the settable type including a pivotally mounted spring-operated flashlight synchronizing member a flashlight circuit including a pair of spaced stationary contact plates in different planes insulated from each other, a pair of spaced electrically connected spring contact fingers insulated from and mounted on said pivoted synchronizing member for movement therewith and having wiping engagement over said stationary contact plates in different planes, an insulating plate on one side of one of the contact plates, and means on the last mentioned contact plate engaging one of said contact fingers during the setting movement of the synchronizing member acting to guide said contact finger over the insulating plate and out of engagement with its contact plate.

4. In a photographic shutter of the settable type including a pivotally mounted spring-operated flashlight synchronizing member a flashlight circuit including a fixed contact plate and an adjustable contact plate in a different plane spaced and insulated therefrom, a pair of spaced electrically connected spring contact fingers insulated from and mounted on said pivoted synchronizing member for movement therewith and having wiping engagement over said contact plates in different planes, one of said contact fingers engaging the adjustable contact plate, an insulating plate on one side of the other of said contact plates and the corresponding contact finger wiping over said insulating plate out of engagement with the contact plate during setting movement of the synchronizing member, and cooperating means on the insulating plate and contact finger acting to guide the contact finger on to the insulating plate at the beginning of said setting movement.

5. In a photographic shutter of the settable type including a pivotally mounted spring-operated flashlight synchronizing member a flashlight circuit including a fixed contact plate and an adjustable contact plate in a different plane spaced and insulated therefrom, said contact plates being arranged in different planes a pair of spaced electrically connected spring contact fingers insulated from and mounted on said pivoted synchronizing member for movement therewith and having wiping engagement over said contact plates in different planes, one of said contact fingers engaging the adjustable contact plate and the other of said contact fingers engaging the fixed contact plate and having an inclined terminal portion at its free end, and an insulating plate overlying the fixed contact plate, said insulating and fixed contact plates having oppositely bevelled portions at their ends which engage said inclined terminal portion of the contact finger to cause said finger to ride up and over said insulating plate during setting movement of the synchronizing member and to ride down and under said contact plate during the operating movement of the synchronizing member.

6. In a photographic shutter of the settable type including a pivotally mounted spring-operated flashlight synchronizing member a flashlight circuit including a fixed contact plate and an adjustable contact plate in a different plane spaced and insulated therefrom, said contact plates being arranged in different planes a conducting member insulated from and mounted on the pivoted synchronizing member for movement therewith, said conducting member consisting of a pair of spring fingers spaced from each other in perpendicular planes, one of said contact fingers having wiping engagement over the adjustable contact plate and the other of said contact fingers having wiping engagement over the fixed contact plate in a different plane from the first mentioned contact finger and having an inclined terminal portion at its free end, and an insulating plate overlying the fixed contact plate, said insulating and fixed contact plates having oppositely bevelled portions at their ends which engage said inclined terminal portion of the contact finger to cause said finger to ride up and over said insulating plate during setting movement of the synchronizing member and to ride down and under said contact plate during the operating movement of the synchronizing member.

7. In a photographic shutter of the settable type including a pivotally mounted spring-operated flashlight synchronizing member a flashlight circuit including an arcuate fixed contact plate and an arcuate adjustable contact plate in a different plane spaced and insulated therefrom, said contact plates being arranged in different planes a conducting member insulated from and mounted on the pivoted synchronizing member for movement therewith, said conducting member consisting of a pair of radially extending spring contact fingers spaced from each other in perpendicular planes, one of said contact fingers having wiping engagement over the adjustable arcuate contact plate and the other of said contact fingers having wiping engagement over the fixed arcuate contact plate in a different plane from the first mentioned contact finger and having an inclined terminal portion at its free end, and an insulating plate overlying the fixed contact plate, said insulating and fixed contact plates having oppositely bevelled portions at their ends which engage said inclined terminal portion of the contact finger to cause said finger to ride up and over said insulating plate during setting movement of the synchronizing member and to ride down and under said contact plate during the operating movement of the synchronizing member.

8. In a photographic shutter of the settable type including a pivotally mounted spring-operated flashlight synchronizing member and a master lever, a flashlight circuit including a fixed arcuate contact plate and an adjustable arcuate contact plate in a different plane spaced and insulated therefrom, a conducting member insulated from and mounted on the pivoted synchronizing member for movement therewith, said conducting member consisting of a pair of radially extending spring contact fingers spaced from each other, one of said contact fingers having wiping engagement over the adjustable arcuate contact plate, means engaging the other of said contact fingers during setting movement of the synchronizing member and acting to move said contact finger out of engagement with its contact plate during such setting movement, said adjustable contact plate having an arcuate edge with an offset portion, a conducting switch arm in the flashlight circuit engaging said arcuate edge of the contact plate when the latter is adjusted to a predetermined position, said switch arm being spaced from and engageable with said offset portion of the contact plate when the latter is adjusted for a maximum speed lamp, means on one of said contact plates engaging the other of said contact plates to connect them electrically when the adjustable contact plate is positioned for a maximum speed lamp, and a device actuated by said master lever when the shutter is in open position operating to engage the switch arm and move it into contact with said offset portion of the contact plate.

9. In a photographic shutter of the settable type including a pivotally mounted spring-operated flashlight synchronizing member and a master lever, a flashlight circuit including a fixed arcuate contact plate and an adjustable arcuate contact plate in a different plane spaced and insulated therefrom, a conducting member insulated from and mounted on the pivoted synchronizing member for movement therewith, said conducting member consisting of a pair of radially extending spring contact fingers spaced from each other, one of said contact fingers having wiping engagement over the adjustable arcuate contact plate, means engaging the other of said contact fingers during setting movement of the synchronizing member and acting to move said contact finger out of engagement with its contact plate during such setting movement, said adjustable contact plate having an arcuate edge with an offset portion, a conducting switch arm in the flashlight circuit engaging said arcuate edge of the contact plate when the latter is adjusted to a predetermined position, said switch arm being spaced from and engageable with said offset portion of the contact plate when the latter is adjusted for a maximum speed lamp, a yieldable terminal portion bent upon and spaced from the body portion of said switch arm, means on one of said contact plates engaging the other of said contact plates to connect them electrically when the adjustable contact plate is positioned for a maximum speed lamp, and a device actuated by said master lever when the shutter is in open position operating to engage said terminal portion and move the switch arm into engagement with said offset portion of the contact plate.

10. In a photographic shutter of the settable type including a pivotally mounted spring-operated flashlight synchronizing member and a master lever, a flashlight circuit including a fixed arcuate contact plate and an adjustable arcuate contact plate in a different plane spaced and insulated therefrom, a conducting member insulated from and mounted on the pivoted synchronizing member for movement therewith, said conducting member consisting of a pair of radially extending spring contact fingers spaced from each other, one of said contact fingers having wiping engagement over the adjustable contact plate, means engaging the other of said contact fingers during setting movement of the synchronizing member and acting to move said contact finger out of engagement with its contact plate during such setting movement, said adjustable contact plate having an arcuate edge with an offset portion, a conducting switch arm in the flashlight circuit engaging said arcuate edge of the contact plate when the latter is adjusted to a predetermined position, said switch arm being spaced from and engageable with said offset portion of the contact plate when the latter is adjusted for a maximum speed lamp, and a device actuated by said master lever when the shutter is in open position operating to engage the switch arm and move it into engagement with said offset portion of the contact plate, one of said contact plates having an extension which engages and connects it electrically with the other of said contact plates when the adjustable contact plate is positioned for a maximum speed lamp and the synchronizing member is moved to inoperative position.

11. In a photographic shutter of the settable type including a pivotally mounted spring-operated flashlight synchronizing member and a master lever, a flashlight circuit including a fixed arcuate contact plate and an adjustable arcuate contact plate in a different plane spaced and insulated therefrom, a conducting member insulated from and mounted on the pivoted synchronizing member for movement therewith, said conducting member consisting of a pair of radially extending spring contact fingers spaced from each other, one of said contact fingers having wiping engagement over the adjustable arcuate contact plate, means engaging the other of said contact fingers during setting movement of the synchronizing member and acting to move said contact finger out of engagement with its contact plate during such setting movement, said adjustable contact plate having an arcuate edge with an offset portion, a conducting switch arm in the flashlight circuit engaging said arcuate edge of the contact plate when the latter is adjusted to a predetermined position, said switch arm being spaced from and engageable with said offset portion of the contact plate when the latter is adjusted for a maximum speed lamp, a yieldable terminal portion bent upon and spaced from the body portion of said switch arm, and a device actuated by said master lever when the shutter is in open position operating to engage said terminal portion and move said body portion of the switch arm yieldably into engagement with said offset portion of the contact plate, one of said contact plates having an extension which engages and connects it electrically with the other of said contact plates when the adjustable contact plate is positioned for a maximum speed lamp and the synchronizing member is moved to inoperative position.

12. In a photographic shutter of the settable type including a pivotally mounted spring-operated flashlight synchronizing member and a master lever, a flashlight circuit including an upper fixed arcuate contact plate and a lower adjustable arcuate contact plate in a different plane spaced and insulated therefrom, a conducting member insulated from and mounted on the pivoted synchronizing member for movement therewith, said conducting member consisting of a pair of radially extending spring contact fingers spaced from each other, one of said contact fingers having wiping engagement over the lower adjustable contact plate, means engaging the other of said contact fingers during setting movement of the synchronizing member and acting to move said contact finger out of engagement with its contact plate during such setting movement, said lower adjustable contact plate having an arcuate edge with an offset portion, a conducting switch arm in the flashlight circuit engaging said arcuate edge of the contact plate when the latter is adjusted to a predetermined position, said switch arm being spaced from and engageable with said offset portion of the contact plate when the latter is adjusted for a maximum speed lamp, means on one of said contact plates engaging the other of said contact plates to connect them electrically when the adjustable contact plate is positioned for a maximum speed lamp, and a device actuated by said master lever when the shutter is in open position operating to engage the switch arm and move it into contact with said offset portion of the contact plate.

13. In a photographic shutter of the settable type including a pivotally mounted spring-operated flashlight synchronizing member and a master lever, a flashlight circuit including an upper fixed arcuate contact plate and a lower adjustable arcuate contact plate in a different plane spaced and insulated therefrom, a conducting member insulated from and mounted on the pivoted synchronizing member for movement therewith, said conducting member consisting of a pair of radially extending spring contact fingers spaced from each other, one of said contact fingers having wiping engagement over the adjustable arcuate contact plate, means engaging the other of said contact fingers during setting movement of the synchronizing member and acting to move said contact finger out of engagement with its contact plate during such setting movement, said adjustable contact plate having an arcuate edge with an offset portion, a conducting switch arm in the flashlight circuit engaging said arcuate edge of the contact plate when the latter is adjusted to a predetermined position, said switch arm being spaced from and engageable with said offset portion of the contact plate when the latter is adjusted for a maximum speed lamp, a yieldable terminal portion bent upon and spaced from the body portion of said switch arm, means on one of said contact plates engaging the other of said contact plates to connect them electrically when the adjustable contact plate is positioned for a maximum speed lamp, and a device actuated by said master lever when the shutter is in open position operating to engage said terminal portion and move the switch arm into engagement with said offset portion of the contact plate.

14. In a photographic shutter of the settable type including a pivotally mounted spring-operated flashlight synchronizing member and a master lever, a flashlight circuit including an upper fixed arcuate contact plate and a lower adjustable arcuate contact plate in a different plane spaced and insulated therefrom, a conducting member insulated from and mounted on the pivoted synchronizing member for movement therewith, said conducting member consisting of a pair of radially extending spring contact fingers spaced from each other, one of said contact fingers having wiping engagement over the adjustable contact plate, means engaging the other of said contact fingers during setting movement of the synchronizing member and acting to move said contact finger out of engagement with its contact plate during such setting movement, said adjustable contact plate having an arcuate edge with in offset portion, a conducting switch arm in the flashlight circuit engaging said arcuate edge of the contact plate when the latter is adjusted to a predetermined position, said switch arm being spaced from and engageable with said offset portion of the contact plate when the latter is adjusted for a maximum speed lamp, and a device actuated by said master lever when the shutter is in open position operating to engage the switch arm and move it into engagement with said offset portion of the contact plate, the upper fixed contact plate having an extension terminating in a portion which engages the adjustable contact plate when the latter is positioned for a maximum speed lamp and the synchronizing member is moved to inoperative position.

15. In a photographic shutter of the settable type including a pivotally mounted spring-operated flashlight synchronizing member and a master lever, a flashlight circuit including an upper fixed arcuate contact plate and a lower adjustable arcuate contact plate in a different plane spaced and insulated therefrom, a conducting member insulated from and mounted on the pivoted synchronizing member for movement therewith, said conducting member consisting of a pair of radially extending spring contact fingers spaced from each other, one of said contact fingers having wiping engagement over the adjustable arcuate contact plate, means engaging the other of said contact fingers during setting movement of the synchronizing member and acting to move said contact finger out of engagement with its contact plate during such setting movement, said adjustable contact plate having an arcuate edge with an offset portion, a conducting switch arm in the flashlight circuit engaging said arcuate edge of the contact plate when the latter is adjusted to a predetermined position, said switch arm being spaced from and engageable with said offset portion of the contact plate when the latter is adjusted for a maximum speed lamp, a yieldable terminal portion bent upon and spaced from the body portion of said switch arm, and a device actuated by said master lever when the shutter is in open position operating to engage said terminal portion and move said body portion of the switch arm yieldably into engagement with said offset portion of the contact plate, the upper fixed contact plate having an extension terminating in a portion which engages the adjustable contact plate when the latter is positioned for a maximum speed lamp and the synchronizing member is moved to inoperative position.

FRIEDRICH A. GUSTAV PIRWITZ.

REFERENCES CITED

The following references are of record in the file of this patent:

UNITED STATES PATENTS

| Number | Name | Date |
| --- | --- | --- |
| 2,145,917 | Boesser | Feb. 17, 1939 |
| 2,279,477 | Mihalyi | Apr. 14, 1942 |
| 2,358,941 | Schwarz | Sept. 26, 1944 |
| 2,404,526 | Pirwitz | July 23, 1946 |
| 2,459,330 | Ley | Jan. 18, 1949 |